US012190709B2

(12) United States Patent
Nayak

(10) Patent No.: US 12,190,709 B2
(45) Date of Patent: Jan. 7, 2025

(54) EMERGENCY HEALTH ALERT SYSTEM

(71) Applicant: T-MOBILE INNOVATIONS LLC, Overland Park, KS (US)

(72) Inventor: Niraj Kiritkumar Nayak, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 239 days.

(21) Appl. No.: 17/863,224

(22) Filed: Jul. 12, 2022

(65) Prior Publication Data

US 2024/0021065 A1 Jan. 18, 2024

(51) Int. Cl.

*G08B 25/00* (2006.01)
*G08B 3/10* (2006.01)
*G08B 21/04* (2006.01)
*G08B 25/01* (2006.01)

(52) U.S. Cl.

CPC ............. *G08B 25/009* (2013.01); *G08B 3/10* (2013.01); *G08B 21/043* (2013.01); *G08B 21/0453* (2013.01); *G08B 25/016* (2013.01)

(58) Field of Classification Search

CPC .................................................... G08B 25/009
See application file for complete search history.

(56) References Cited

U.S. PATENT DOCUMENTS 5,309,506 A * 5/1994 Alexander ............. H04M 11/04 379/37
7,843,330 B2 * 11/2010 Chamberlain ......... G16H 40/63 340/568.1
2005/0128068 A1* 6/2005 Winick ................ G08B 25/008 340/517
2008/0246629 A1* 10/2008 Tsui ...................... H02J 50/001 340/870.07
2010/0099994 A1* 4/2010 Holmstrom .......... A61B 5/1107 600/508
2011/0009711 A1* 1/2011 Nanikashvili ........ A61B 5/0006 600/301
2011/0163880 A1* 7/2011 Halff ...................... G09B 23/28 434/236
2011/0163881 A1* 7/2011 Halff ...................... G16H 40/67 340/573.1
2015/0018635 A1* 1/2015 Dinesen ............... A61B 5/4343 600/301
2015/0221196 A1* 8/2015 Rafin ..................... H04N 7/148 340/521
2015/0364028 A1* 12/2015 Child ...................... G08B 1/08 340/541
2016/0165425 A1* 6/2016 Diamond ............... G16H 10/60 455/404.2
2019/0362822 A1* 11/2019 Haveri ................. A61B 5/0002
2021/0118579 A1* 4/2021 Morris ................... G16H 80/00
2021/0295965 A1* 9/2021 Schlegel ................ G16H 40/67
2022/0139190 A1* 5/2022 Williams ............... G16H 40/67 340/573.1
2022/0359064 A1* 11/2022 Pierson .................. G16H 40/40

* cited by examiner

*Primary Examiner* — Travis R Hunnings
(74) *Attorney, Agent, or Firm* — Shook, Hardy & Bacon L.L.P.

(57) ABSTRACT

Embodiments of the present disclosure include systems and methods for communicating information regarding medical events detected at a wearable electronic device. Communications may be transmitted to one or more of a first mobile device, home security system, speaker, second mobile device, medical facility, and emergency response center, for example.

20 Claims, 4 Drawing Sheets

EMERGENCY HEALTH ALERT SYSTEM

SUMMARY

The present disclosure is directed, in part, to systems and methods for communicating information regarding medical events. After detecting a medical event at a wearable electronic device, a first communication may be transmitted from the wearable electronic device to a first mobile device, which may, in turn, transmit related communications to a home security system (such that the home security system emits an audible alarm), a second mobile device (e.g., a friend, family member, or caretaker's mobile device), a medical facility, and/or an emergency response center. As a result, a person experiencing the medical event may benefit from a more rapid and/or comprehensive response to the medical event than would be possible using traditional systems.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
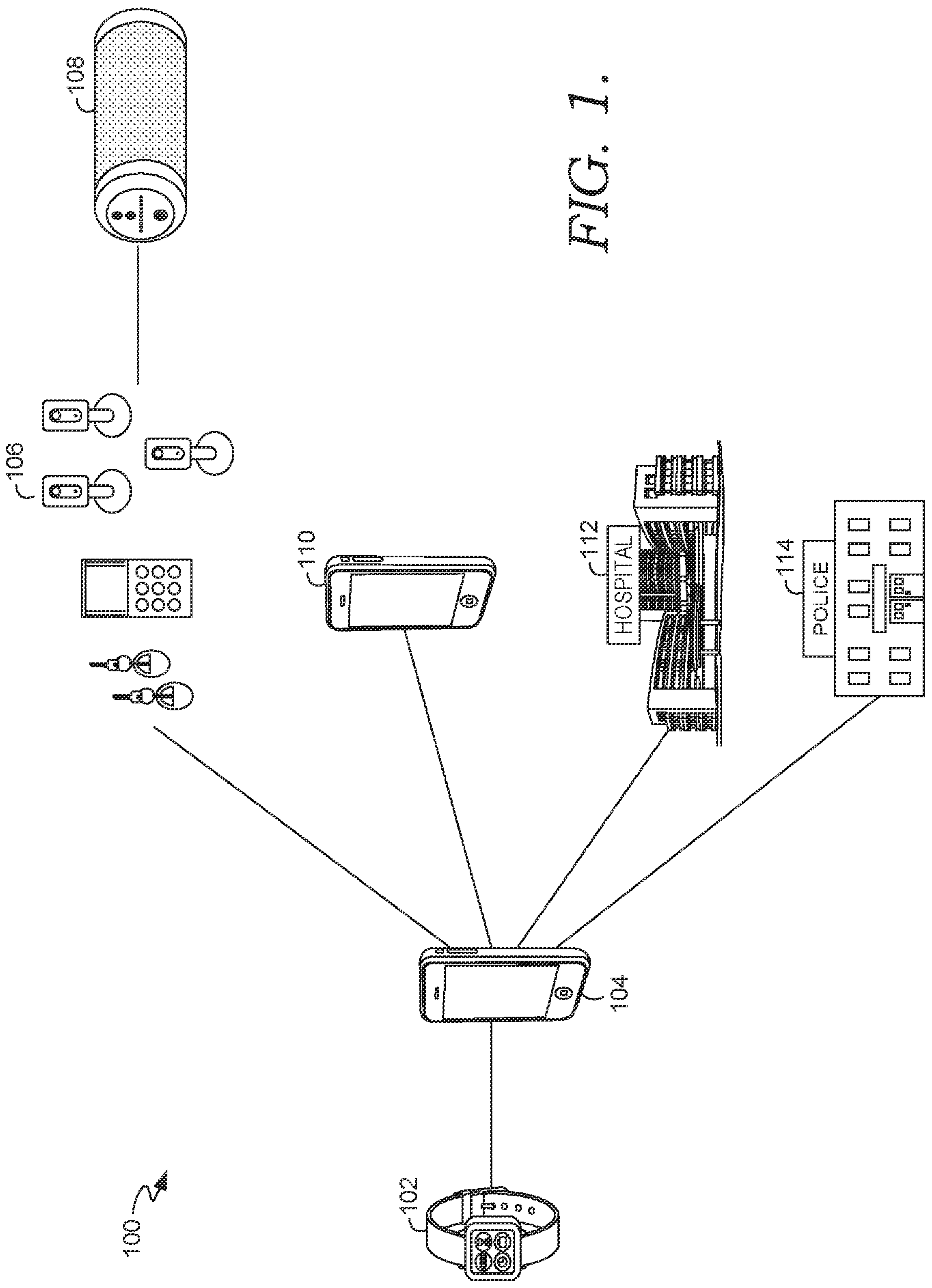
FIG. 1 depicts a diagram of an exemplary system for transmitting communications regarding a medical event detected at a wearable electronic device.

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, wearable electronic devices (e.g., smart watches or fitness trackers) are rapidly evolving to include increasingly advanced sensors for monitoring the wearer's health. For example, wearable electronic devices may comprise optical and/or electrical heart sensors, blood oxygen sensors, and/or accelerometers. As such, some wearable electronic devices are able to detect anomalous physical or physiological activity (e.g., heart attacks (and/or other heart conditions), abnormally low blood oxygen levels, and falls).

Though wearable devices include advanced systems and sensors for detecting or determining adverse medical conditions, modern wearable devices are not integrated with other consumer-based systems that can, for example, alert others in proximity to the wearer when an adverse medical condition occurs. Even if the wearer is cognizant of the medical event and is able to call for help, critical time may be lost during the communication process.

Thus, the present disclosure provides, in some aspects, a system for automatically communicating information regarding a medical event to various third-party systems such that the person experiencing the medical event may be able to rapidly obtain medical assistance. For example, in response to detecting a medical event at a wearable electronic device and communicating an indication of the adverse medical event to a home security system, the home security system may emit an audible alarm, alerting other inhabitants of the home to the medical emergency such that aid may be rendered by the other inhabitants instead of waiting for emergency first responders, greatly reducing the critical time the wearer must wait before receiving potentially life-saving aid. In addition to alerting nearby inhabitants, information regarding the medical event may also be communicated to external entities such as one or more mobile devices, hospitals, and/or emergency response centers.

A first aspect of the present disclosure is directed to a method, the method comprising detecting, at a wearable electronic device, a medical event associated with a person wearing the wearable electronic device. The method further comprises: based on the detecting, transmitting, from the wearable electronic device, a first communication to a first mobile device, wherein the first communication causes the first mobile device to transmit a second communication to a home security system, and wherein the second communication causes the home security system to emit an audible alarm.

A second aspect of the present disclosure is directed to one or more computer storage media having instructions embodied thereon that, when executed by one or more processors, cause the one or more processors to perform a method. The method comprises receiving, from a wearable electronic device, a first communication indicative of a medical event associated with a person wearing the wearable electronic device. The method further comprises: based on the receiving, transmitting a second communication to a home security system, wherein the second communication causes the home security system to emit an audible alarm.

A third aspect of the present disclosure is directed to a method. The method comprises receiving, at a home security system, a first communication from a wearable electronic device, wherein the first communication is indicative of a medical event associated with a person wearing the wearable electronic device. The method further comprises: based on the receiving, emitting, from the home security system, an audible alarm.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer storage media. "Computer storage media" may include, without limitation, volatile and non-volatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information. Computer storage media does not comprise a signal per se.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Turning now to FIG. 1, a diagram of an exemplary system 100 for transmitting communications regarding a medical event detected at a wearable electronic device 102 is depicted. The system may comprise a wearable electronic device 102, a first mobile device 104, a home security system 106, a speaker 108, a second mobile device 110, a medical facility 112, and/or an emergency response center 114, for example. The elements of the system 100 may be configured to communicate with one another using one or more communication networks, protocols, and/or methods, including cellular networks, other wired or wireless internet connections, and/or short-range communication protocols (e.g., Bluetooth or near-field communication), for example.

The system 100 may comprise a wearable electronic device 102 (or "wearable"). The wearable 102 may be configured to be worn on the body of a wearer and detect or determine one or more physical or physiological conditions of the wearer. The wearable 102 may comprise a smart watch, fitness tracker, heart rate monitor, step counter, or health alert device, for example. The wearable 102 may further comprise one or more computer storage media, which may have computer-executable instructions embodied thereon that, when executed by one or more processors, cause the one or more processors to perform the steps and/or methods described herein.

The wearable may comprise one or more sensors which may be configured to monitor the wearer's health. Such sensors may include, for example, a heart rate sensor, other electrical heart sensors (e.g., sensors that enable the wearer to take an electrocardiogram), a blood oxygen sensor, and/or an accelerometer. One or more of the sensors may be configured to detect a medical event associated with the wearer. For example, the heart rate sensor may be configured to detect an abnormally high or low heart rate; the other electrical heart rate sensor(s) may be configured to detect heart attacks, atrial fibrillation, and/or other heart arrhythmia; the blood oxygen sensor may be configured to detect abnormally low blood oxygen levels; and the accelerometer may be configured to detect falls.

The wearable 102 may be configured to transmit and/or receive communications to and/or from the first mobile device 104 using one or more communication networks, protocols, and/or methods, including cellular networks, other wired or wireless internet connections, and/or short-range communication protocols, for example. The wearable 102 may also be configured to transmit and/or receive communications to and/or from one or more other elements of the system 100 as discussed below with reference to FIG. 2.

In response to detecting a medical event associated with the wearer (for example, using one or more of the sensors described above), the wearable 102 may transmit a first communication to the first mobile device 104. Examples of such "medical events" are provided above. The first communication may comprise, for example, information regarding the medical event, such as the type of medical event (e.g., heart arrhythmia, fall, or low blood oxygen level), the wearer's location, and/or personal and/or health information regarding the wearer (e.g., name, age, allergies, and/or known medical conditions). In some embodiments, the wearable 102 may be configured to transmit the first communication to the home security system 106 instead of (or in addition to) the first mobile device 104.

The wearable 102 may further be configured to transmit one or more additional communications subsequent to the first communication. Such subsequent communications may comprise further information related to the wearer's health and/or the medical event associated with the wearer, including the types of information described above with reference to the first communication. For example, if the wearable 102 transmits a communication to the first mobile device 104 regarding a heart arrhythmia and the wearable 102 subsequently detects that the wearer's heart has stopped beating, the wearable 102 may subsequently communicate such information to any of the elements of the system 100. In this example, the communicated information may, for example, enable a recipient thereof to realize, before arriving at the wearer's location, that the wearer requires a defibrillator, saving crucial time that could be material to the health or survival of the wearer.

The first mobile device 104 may comprise a smart phone, personal computer (such as a tablet computer, laptop computer, or desktop computer), or other personal electronic device configured to receive data from the wearable 102. The first mobile device 104 may further comprise one or more computer storage media, which may have computer-executable instructions embodied thereon that, when executed by one or more processors, cause the one or more processors to perform the steps and/or methods described herein.

The first mobile device 104 may be configured to receive communications from the wearable 102 using the communication methods described above, for example. The first mobile device 104 may further be configured to transmit communications to one or more of the other elements of the system, including the wearable 102, home security system 106, speaker 108, second mobile device 110, medical facility 112, and/or emergency response center 114.

It is contemplated herein that the first mobile device 104 may transmit the first, second, third, and/or fourth communications in any order—for example, the first communication may be transmitted after the second communication. In some embodiments, two or more communications may be transmitted simultaneously.

It is further contemplated herein that the first mobile device 104 may transmit communications to any possible combination of the home security system 106, second mobile device 110, medical facility 112, and emergency response center 114. For example, in some embodiments, the first mobile device may transmit communications to the home security system 106 and the emergency response center 114 but not the second mobile device 110 or medical center 112. In other embodiments, the first mobile device 104 may transmit only one communication to any of the home security system 106, second mobile device 110, medical center 112, and emergency response center 114.

In some embodiments, in response to receiving the first communication from the wearable 102 (e.g., a communication indicative of a medical event associated with the wearer), the first mobile device 104 may transmit a second communication to a home security system 106. The home security system 106 may comprise one or more computer storage media, which may have computer-executable instructions embodied thereon that, when executed by one or more processors, cause the one or more processors to perform the steps and/or methods described herein. The second communication may be transmitted, for example, via an application (e.g., a mobile app created by the manufacturer of the wearer's home security system 106) installed on the first mobile device 104 that is configured to interface with the home security system 106. In some embodiments, the second communication may cause the home security system 106 to emit an audible alarm. The audible alarm may be emitted by one or more speakers 108 connected to the home security system 106. The audible alarm may alert another person present in physical proximity to the wearer (e.g., a person present in the wearer's home, such as a family member, caretaker, visitor, or other co-inhabitant of the home) of the medical event associated with the wearer, resulting in faster response time than would otherwise be possible. In some embodiments, the second communication may be transmitted to the home security system 106 automatically in response to the medical event; in other embodiments, an element of the system 100 (e.g., the wearable 102 or the first mobile device 104) may require explicit input from the wearer (e.g., confirming that the wearer wishes to call for help) before transmitting the second communication.

Emitting the audible alarm from a speaker 108 connected to a home security system 106 provides several advantages over, for example, simply emitting an alarm from a generic speaker that is not connected to a home security system. First, home security systems are (a) ubiquitous and (b) typically connected to speaker systems that are widespread and/or loud enough to emit an alarm that is audible to anyone present in the home. It is relatively uncommon for homes to be equipped with non-security-related speaker systems that share these properties. Second, home security systems are typically preconfigured to transmit communications to emergency response centers (such as emergency response center 114), which may reduce the work and/or complexity involved in constructing some embodiments of the system 100, such as embodiment(s) described below in reference to FIG. 2 (e.g., embodiments in which the home security system 206 is configured to transmit communications to the emergency response center 214). Third, home security systems are often preconfigured to connect to the internet, which may further reduce the work and/or complexity involved in constructing embodiment(s) described below in reference to FIG. 2 (e.g., embodiments in which the home security system 206 is configured to transmit communications to the speaker 208, mobile device 210, medical center 212, and/or emergency response center 214).

In some embodiments, in response to receiving the first communication from the wearable 102 (e.g., a communication indicative of a medical event associated with the wearer), the first mobile device 104 may transmit a third communication to a second mobile device 110. The second mobile device may comprise a cell phone or personal computer, for example. The third communication may be transmitted to and/or displayed on the second mobile device 110 in the form of a push notification, email, text message, or phone call, for example. Any or all of the information communicated to the second mobile device 110 regarding the medical event may be displayed thereon. The third communication may comprise information regarding the identity of the wearer and/or the medical event, such as the type of medical event (e.g., heart arrhythmia, fall, or low blood oxygen level), the wearer's location, and/or personal and/or health information regarding the wearer (e.g., name, age, allergies, and/or known medical conditions). In some embodiments, the second mobile device may be in the possession of a person other than the wearer (e.g., a friend, family member, or caretaker). Accordingly, the system 100 may alert one or more individuals of the medical event associated with the wearer even if the one or more individuals are not in close proximity to the wearer or the one or more speakers 108, if the wearer does not possess a home security system 108, or if the wearer has not configured the wearable to activate the home security system 108 in response to a medical event. This configuration may enable the one or more individuals to call for help on the wearer's behalf and/or perform a wellness check on the wearer.

In some embodiments, in response to receiving the first communication from the wearable 102 (e.g., a communication indicative of a medical event associated with the wearer), the first mobile device 104 may transmit a fourth communication to a medical facility 112. The fourth communication may be transmitted using one or more communication networks, protocols, and/or methods, including cellular networks, other wired or wireless internet connections, and/or short-range communication protocols, for example. The particular medical facility 112 to which the fourth communication is sent may be selected based on its physical proximity to the wearer and/or one or more prior interactions between the wearer and the medical facility 112 (e.g., prior emergency room visits to that medical facility 112). In some embodiments, the fourth communication may be transmitted to a plurality of medical facilities 112 proximate to the wearer's location (e.g., within a certain radius of the wearer's location). The fourth communication may comprise, for example, information regarding the wearer and/or the medical event, such as the type of medical event (e.g., heart arrhythmia, fall, or low blood oxygen level), the wearer's location, and/or personal and/or health information regarding the wearer (e.g., name, age, allergies, and/or known medical conditions). Accordingly, if the wearer is transported to the medical facility (e.g., for treatment in response to the medical event), personnel at the medical facility 112 may already be aware of one or more details regarding the medical event (e.g., the wearer had a heart attack) and/or the wearer (e.g., the wearer's allergies), enabling the personnel to provide better-tailored care to the wearer in a more timely fashion.

In some embodiments, after receiving one or more communications (such as the fourth communication transmitted by the first mobile device 104) indicative of a medical event from one or more other components of the system 100, the medical facility 112 may additionally transmit one or more communications to one or more components of the system 100. For example, the medical facility 112 may transmit one or more communications to the wearable 102 and/or first mobile device 104 in order to, for example, request data regarding the wearer and/or medical event. For instance, the medical facility 112 may request, from the wearable 102 and/or first mobile device 104, additional heart rate and/or or other biometric data associated with the wearer. Such a request may cause one or more components of the system 100 to transmit the requested information to the medical facility 112.

In some embodiments, in response to receiving the first communication from the wearable 102 (e.g., a communication indicative of a medical event associated with the wearer), the first mobile device 104 may transmit a fifth communication to an emergency response center 114. The emergency response center 114 may comprise a 9-1-1 call center, ambulance, police station, or fire station, for example. The fifth communication may be transmitted over the internet using one or more communication networks, protocols, and/or methods, including cellular networks, other wired or wireless internet connections, and/or short-range communication protocols, for example. The particular emergency response center 114 to which the fifth communication is sent may be selected based on its physical proximity to the wearer, for example. The fifth communication may comprise, for example, information regarding the wearer and/or the medical event, such as the type of medical event (e.g., heart arrhythmia, fall, or low blood oxygen level), the wearer's location, and/or personal and/or health information regarding the wearer (e.g., name, age, allergies, and/or known medical conditions). Accordingly, if, for example, the emergency response center 114 dispatches an ambulance (e.g., to render emergency medical aid to the wearer in response to the medical event), medical personnel arriving in the ambulance may already be aware of one or more details regarding the medical event (e.g., the wearer had a heart attack) and/or the wearer (e.g., the wearer's allergies) upon their arrival, enabling the medical personnel to provide better-tailored care to the wearer in a more timely fashion.

In some embodiments, after receiving one or more communications (such as the fifth communication transmitted by the first mobile device 104) indicative of a medical event from one or more other components of the system 100, the emergency response center 114 may additionally transmit one or more communications to one or more components of the system 100. For example, the emergency response center 114 may transmit one or more communications to the wearable 102 and/or first mobile device 104 in order to, for example, request data regarding the wearer and/or medical event. For instance, the medical facility 112 may request, from the wearable 102 and/or first mobile device 104, additional heart rate and/or or other biometric data associated with the wearer. Such a request may cause one or more components of the system 100 to transmit the requested information to the emergency response center 114.

In some aspects, the system 100 may result in medical aid being rendered to the wearer in a manner that is more comprehensive and/or rapid than is possible using traditional systems and methods. For example, some existing systems enable a user to contact an emergency response center by pressing a button, but such systems may not, for example, provide a way for the user to obtain aid prior to the arrival of an ambulance. Moreover, such systems may not be configured to collect and transmit information regarding the user and/or the medical event to parties who could use that information to provide improved care.

The system 100 described above with reference to FIG. 1 overcomes the aforementioned shortcomings of existing systems. For example, in some embodiments, the system 100 enables transmission of each of the first, second, third, fourth, and fifth communications (as described above). Compared to existing systems and methods, the system 100 may provide a far more comprehensive and rapid response to a medical event associated with the wearer, and the elements of the system 100 may serve complementary functions. For example, the audible alarm emitted by the one or more speakers 108 associated with the home security system 106 may enable a family member or caretaker (for example) to provide immediate care to the wearer while an ambulance dispatched by the emergency response center 114 is on its way to the wearer's location. An individual in possession of the second mobile device 110 may, for example, use the information contained in the third communication to notify the wearer's family and/or friends of the medical event. Then, upon the wearer's arrival at the medical facility 112, the medical personnel at the medical facility 112 may already be armed with knowledge regarding the wearer and/or medical event about which the medical personnel would not otherwise have known.

Figure 2:
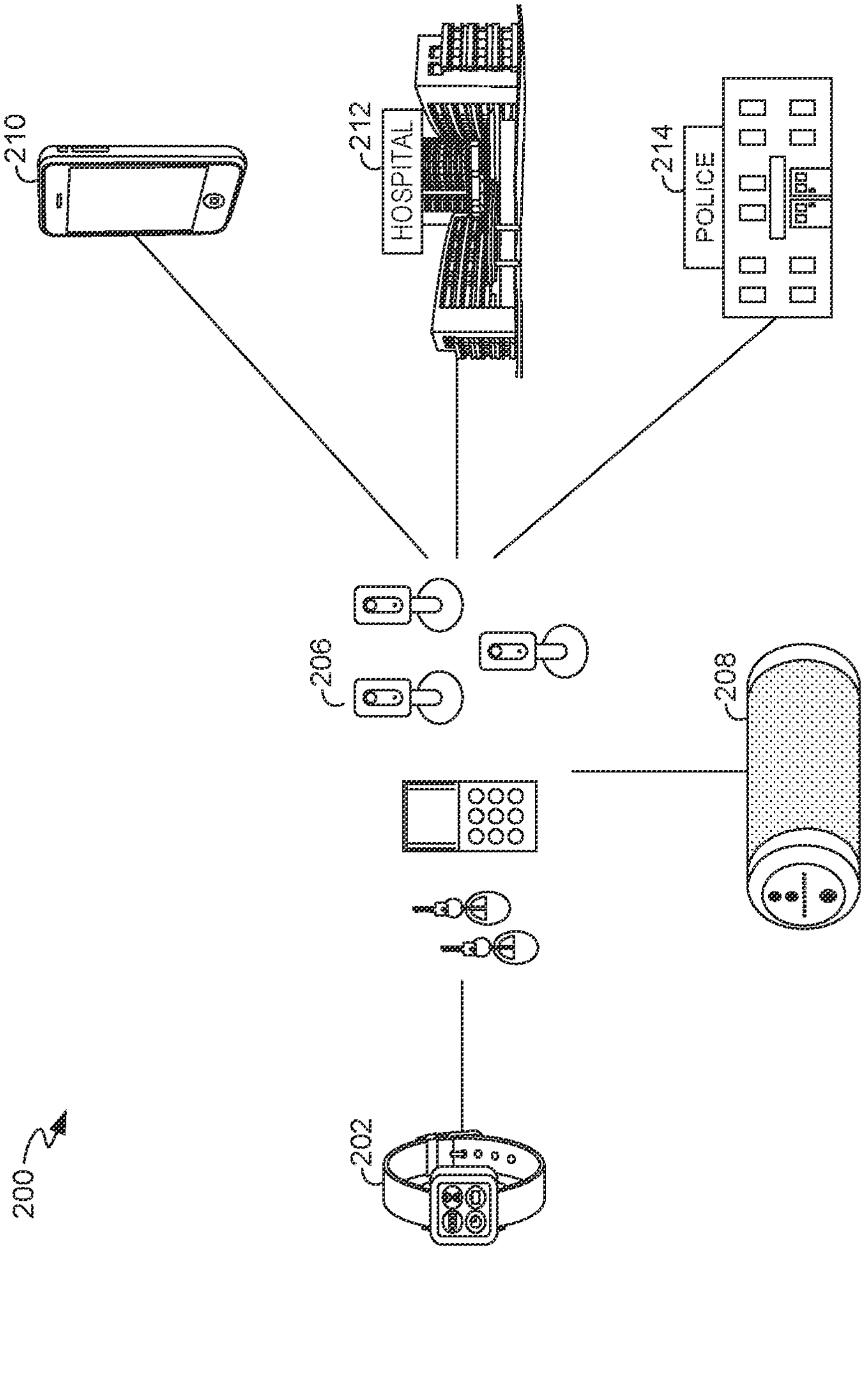
FIG. 2 depicts a diagram of an exemplary system for transmitting communications regarding a medical event detected at a wearable electronic device, wherein the wearable electronic device communicates directly with various other entities/devices without the use of an intermediary mobile device.

Turning now to FIG. 2, FIG. 2 depicts a diagram of an exemplary system 200 for transmitting communications regarding a medical event detected at a wearable electronic device 202. The system may comprise a wearable electronic device 202, a home security system 206, a speaker 208, a mobile device 210, a medical facility 212, and/or an emergency response center 214, for example. The elements of the system 200 may be configured to communicate with one another using one or more communication networks, protocols, and/or methods, including cellular networks, other wired or wireless internet connections, and/or short-range communication protocols, for example.

In some embodiments, the system 200 may be similar to the system 100 described above in reference to FIG. 1 except that, for example, the wearable 202 may be configured to transmit communications to the home security system 206 (i.e., without the use of an intermediary device such as the first mobile device 104). Thus, even if the wearable is unable to communicate directly with a mobile device (such as the first mobile device 104, for example)—e.g., because the wearable is not configured to communicate with such a mobile device or the mobile device is turned off, out of power, or out of range of the wearable—the wearable may still be able to communicate information relevant to the wearer's medical event, for example. In the same or other embodiments, the home security system 206 may be configured to transmit communications to the mobile device 210, medical facility 212, and/or emergency response center 214 (in addition to the speaker 208).

In some embodiments, the wearable 202 may transmit one or more communications to the home security system 206. These one or more communications may comprise information similar to that described above in regard to the communications transmitted from the wearable 102 to the first mobile device 104 (e.g., the communications may comprise information about a medical event detected by the wearable 202). In some embodiments, the one or more communications transmitted from the wearable 202 to the home security system 206 may be transmitted via a cellular network, other wireless internet connection, hardwired internet connection, local area network (LAN), and/or a short-range communication protocol, for example. In some embodiments, the one or more communications may be transmitted, for example, over the internet via an application (e.g., a mobile app created by the manufacturer of the wearer's home security system 206) installed on the wearable 202 that is configured to interface with the home security system 206.

In some embodiments, the home security system 206 may transmit communications to the mobile device 210, medical facility 212, and/or emergency response center 214 in one or more of a variety of ways. For example, many existing home security systems are configured to transmit communications over telephone landlines (e.g., to contact public safety authorities in case of a home invasion or fire), so the home security system 206 may be configured to transmit communications to the mobile device 210, medical facility 212, and/or emergency response center 214 using such a telephone landline. In other embodiments, or in addition, the home security system 206 may be configured to transmit communications to the mobile device 210, medical facility 212, and/or emergency response center 214 using a wireless and/or hardwired internet connection, for example.

Figure 3:
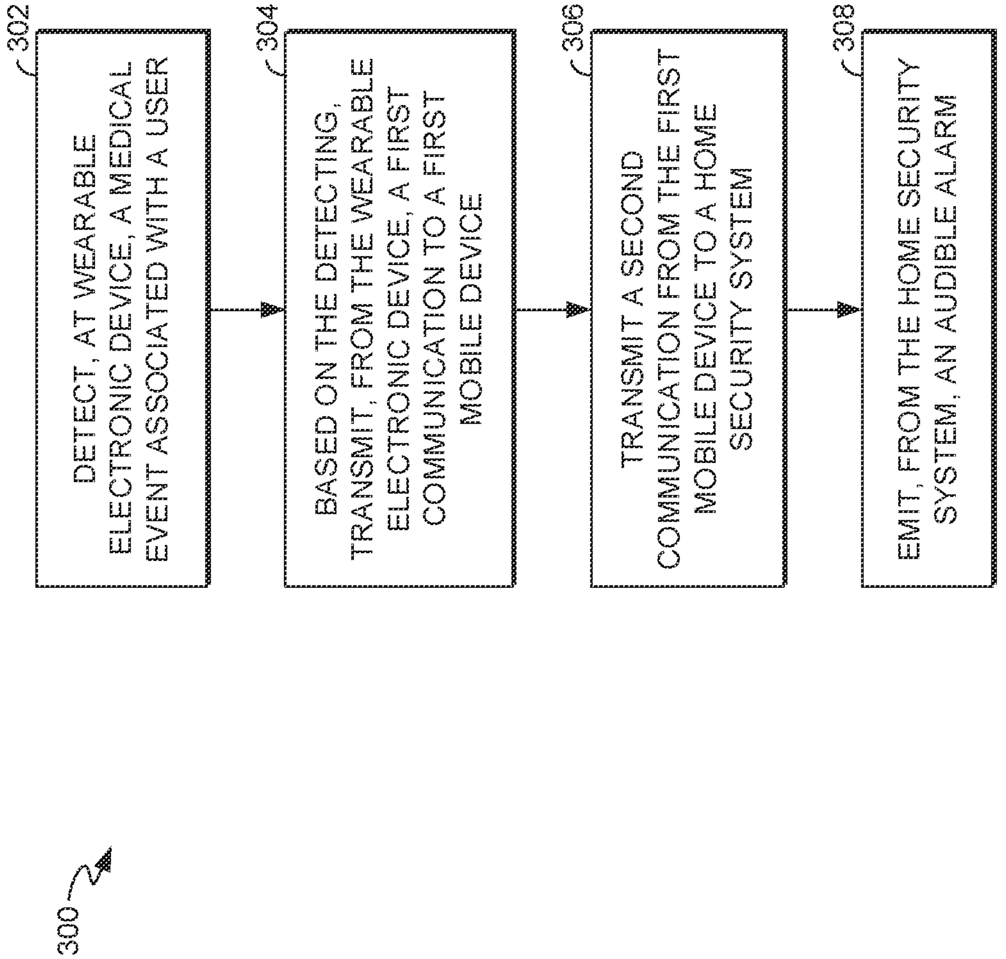
FIG. 3 depicts a flow diagram of an exemplary method for transmitting communications regarding a medical event detected at a wearable electronic device.

Turning now to FIG. 3, a flowchart is provided of a method 300. The method 300 is intended to be exemplary in nature and not intended to limit the scope of the disclosure. Initially at block 302, a medical event associated with a user is detected at a wearable electronic device, such as the wearable 102. The medical event may be, for example, any of the medical events listed above in reference to FIG. 1. At block 304, a first communication is transmitted to a first mobile device, such as the first mobile device 104, based on the detecting. The first communication may comprise any or all of the characteristics of the first communication described above with respect to FIG. 1, for example. At block 306, a second communication is transmitted from the first mobile device to the home security system, such as the home security system 106. The second communication may comprise any or all of the characteristics of the second communication described above with respect to FIG. 1, for example. At block 308, an audible alarm is emitted from the home security system. The alarm may be emitted from one or more speakers connected to the home security system, such as speaker 108. The emitting may be caused by the second communication.

Figure 4:
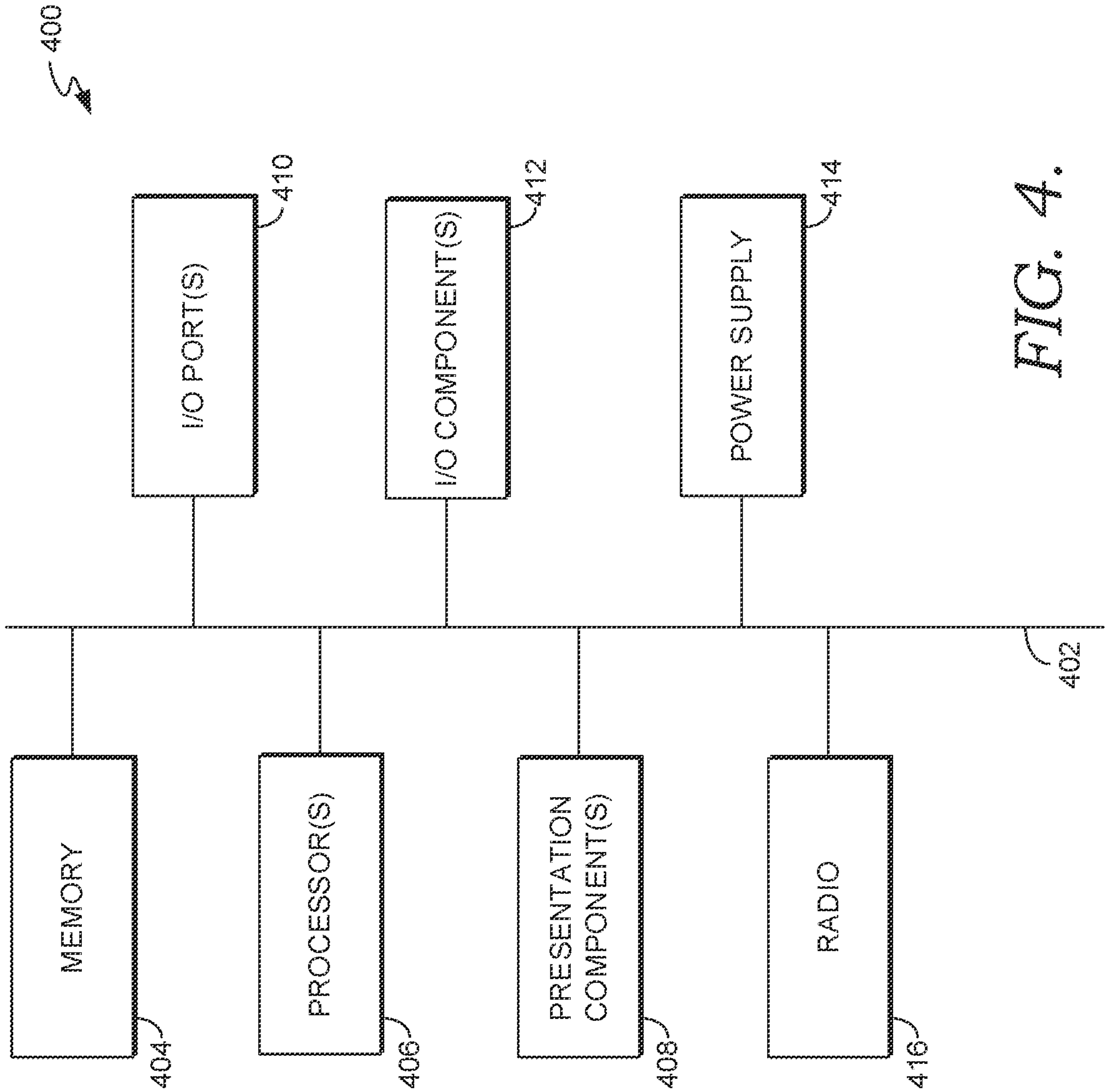
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be a device capable of two-way wireless communications. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 416, input/output (I/O) port(s) 410, input/output (I/O) component(s) 412, and/or power supply 414. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 412. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 416 represents one or more radios that facilitate communication with a wireless telecommunication network. For example, radio(s) 416 may be connected to one or more antenna elements through a physical path. Illustrative wireless telecommunications technologies include CDMA, GPRS, TDMA, GSM, and the like. Radio(s) 416 might additionally or alternatively facilitate other types of wireless communications including Wi-Fi, WiMAX, 4G, 3G, LTE, satellite, mMIMO, 5G, NR, VoLTE, and/or other VoIP communications. As can be appreciated, in various embodiments, radio(s) 416 may be configured to concurrently support multiple technologies, as previously discussed herein. As such, each of many radio(s) 416 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 410 may take a variety of forms. Exemplary I/O ports 410 may include a USB jack, a stereo jack, an infrared port, a firewire port, other proprietary communications ports, and the like. Input/output (I/O) components 412 may comprise keyboards, microphones, speakers, touchscreens, and/or any other item usable to directly or indirectly input data into the computing device 400.

Power supply 414 may include batteries, fuel cells, and/or any other component that may act as a power source to supply power to the computing device 400 or to other network components, including through one or more electrical connections or couplings. Power supply 414 may be configured to selectively supply power to different components independently and/or concurrently.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method comprising:

detecting, at a wearable electronic device, a medical event associated with a person wearing the wearable electronic device; and based on the detecting, transmitting, from the wearable electronic device, a first communication to a first mobile device, wherein the first communication causes the first mobile device to transmit a second communication to a home security system, and wherein the second communication causes the home security system to emit an audible alarm.

2. The method of claim 1, wherein the first communication further causes the first mobile device to transmit, to a second mobile device, a third communication, wherein the third communication causes the second mobile device to display a notification comprising information regarding the medical event.

3. The method of claim 2, wherein the information regarding the medical event comprises an identity of the person wearing the wearable electronic device.

4. The method of claim 1, wherein the first communication further causes the first mobile device to transmit, to a medical facility, a fourth communication comprising data regarding the medical event.

5. The method of claim 4, wherein the first communication further causes the first mobile device to transmit, to an emergency response center, a fifth communication comprising information regarding the medical event.

6. The method of claim 1, wherein the medical event comprises an irregular heartbeat.

7. One or more non-transitory computer storage media having computer-executable instructions embodied thereon that, when executed by one or more processors, cause the one or more processors to perform a method, the method comprising: receiving, from a wearable electronic device, a first communication indicative of a medical event associated with a person wearing the wearable electronic device; and based on the receiving, transmitting a second communication to a home security system, wherein the second communication causes the home security system to emit an audible alarm.

8. The non-transitory media of claim 7, wherein the method further comprises: based on the receiving, transmitting, to a mobile device, a third communication, wherein the third communication causes the mobile device to display a notification comprising information regarding the medical event.

9. The non-transitory media of claim 8, wherein the information regarding the medical event comprises an identity of the person wearing the wearable electronic device.

10. The non-transitory media of claim 7, wherein the method further comprises: based on the receiving, transmitting, to a medical facility, a fourth communication comprising information regarding the medical event.

11. The non-transitory media of claim 10, wherein the method further comprises: based on the receiving, transmitting, to an emergency response center, a fifth communication comprising information regarding the medical event.

12. The non-transitory media of claim 7, wherein the medical event comprises an irregular heartbeat.

13. A method comprising:

receiving, at a home security system, a first communication from a wearable electronic device, wherein the first communication is indicative of a medical event associated with a person wearing the wearable electronic device;

based on the receiving, emitting, from the home security system, an audible alarm; and transmitting to a mobile device a second communication, wherein the second communication causes the mobile device to display a notification comprising information regarding the medical event.

14. The method of claim 13, wherein the first communication is transmitted from the wearable electronic device through the mobile device to the home security system.

15. The method of claim 13, wherein the information regarding the medical event comprises an identity of the person wearing the wearable electronic device.

16. The method of claim 13, wherein the first communication further causes the home security system to transmit, to a medical facility, a third communication comprising data regarding the medical event.

17. The method of claim 16, wherein the first communication further causes the home security system to transmit, to an emergency response center, a fourth communication comprising information regarding the medical event.

18. The method of claim 13, wherein the first communication is transmitted over a cellular network.

19. The method of claim 13, wherein the medical event comprises an irregular heartbeat.

20. The method of claim 13, wherein the medical event comprises a fall.

* * * * *